Patented Jan. 5, 1954

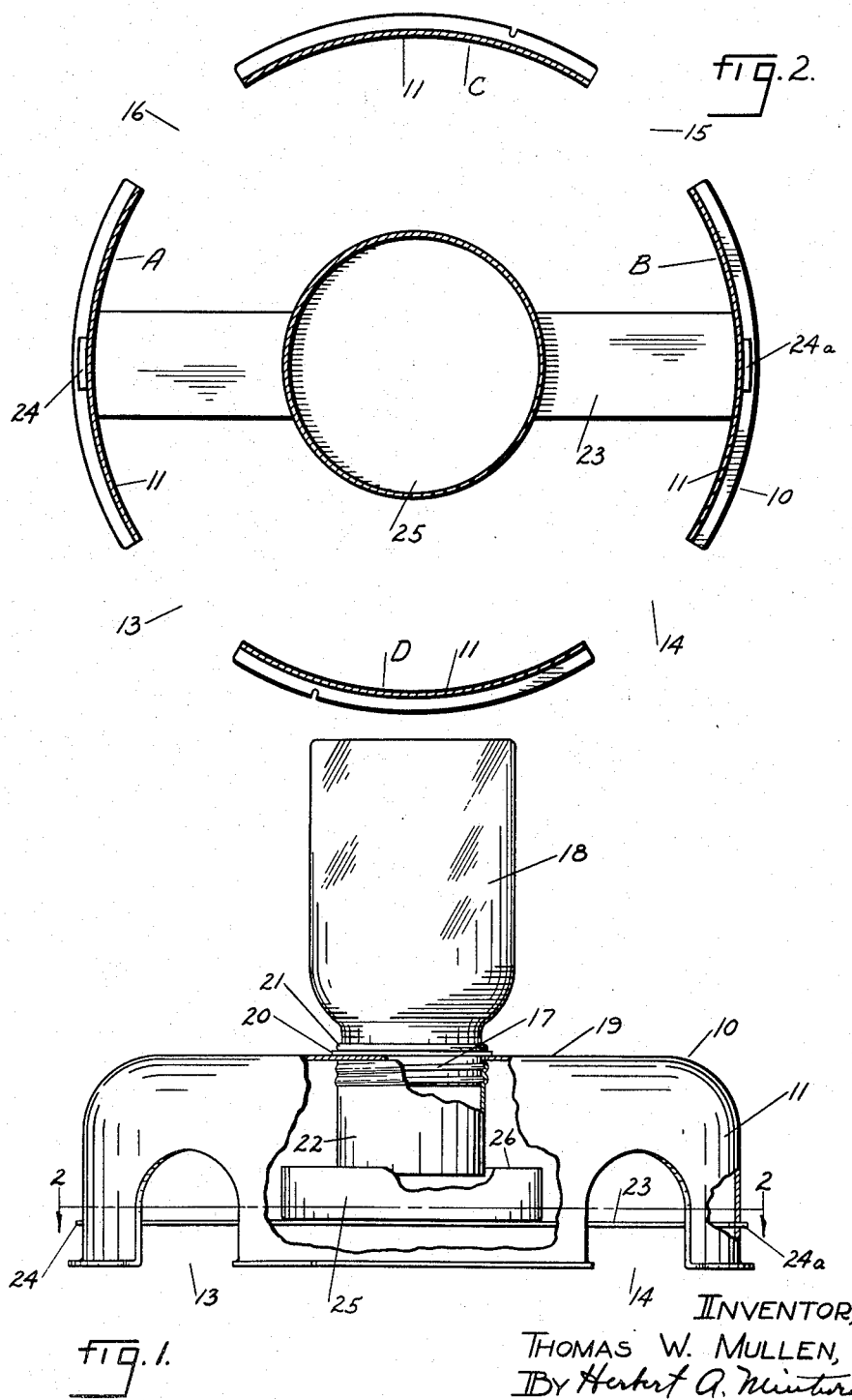

2,664,663

UNITED STATES PATENT OFFICE 2,664,663

DISPENSER OF RODENTICIDES

Thomas W. Mullen, Evansville, Ind.

Application January 31, 1952, Serial No. 269,225

2 Claims. (Cl. 43—131)

This invention relates to a device for dispensing a bait in a "flowable" state wherein the bait is incorporated in some sort of a cereal or the like which is in meal form. A primary purpose of the invention is to provide a structure which will be inviting to rats and mice, particularly taking into account the natural behavior of such rodents. A study of these rodents discloses the fact that they will readily enter and feed within a structure wherein they can have a place to protect their rear portions. These rodents seem to realize that they are in an awkward position when they are eating, and will back up against a wall or a corner whenever possible while so doing. They want to be protected from the rear side. This is particularly true of rats. If they can hide behind a barrier or some sort of a baffle within a structure, where they can be assured of having an exit removed from an entryway through which some enemy might come, they will be more ready to enter the structure and feed on the bait provided therein.

Other important objects and advantages of the invention will become apparent in the following description which is made in reference to the accompanying drawing, in which Fig. 1 is a view in side elevation and partial section of a structure embodying the invention; and Fig. 2 is a horizontal section on the line 2—2 in Fig. 1.

I provide a shell 10 which is generally dome-shaped, and preferably made out of metal to be long enduring and to be substantially weatherproof. In the downturned side wall 11 I provide a plurality of entryways, herein shown as four in number, and designated by the numerals 13, 14, 15, and 16. These entryways are dimensioned to permit a rat to enter therein with a tolerably close clearance.

The mouth end 17 of a receptacle 18, herein shown as in the general shape and style of a Mason glass jar, is entered through the top 19 of the shell 10, to have an intervening gasket 20 between the rib 21 around the portion 17, and the top 19 so as to form a watertight seal.

As indicated in Fig. 1, this mouth portion 17 of the receptacle 18 extends below the top 19 a sufficient distance to permit a tube 22 to have its upper end screw-threadedly engaged therewith. The internal diameter of the tube 22 is substantially equal to the external diameter of the root of the threads on the portion 17.

A plate 23 is provided to extend diametrically across the shell 10 and to have a tongue 24 on one end and a tongue 24a on the other end extend through the side wall 11 as a means of supporting the plate 23 at a distance above the lower level of the wall 11. By reason of the presence of the openings 13, 14, 15, and 16, the lower portions of the wall 11 between those openings may be sprung apart, in order to permit the tongues 24 and 24a to be inserted through the wall, whereupon the wall 11 will spring back and retain the plate 23 in its horizontally disposed position. This also holds the plate 23 in a substantially horizontally disposed plane, at least it will hold it against rotating about its longitudinal axis.

On the top side of the plate 23, there is a shallow cup 25 fixed thereto, and centrally of its length. The tube 22 has a sufficient length to depend within the cup 25 a slight distance below the top edge 26 of the cup as indicated in Fig. 1, so that the bait carried in the receptacle 18 will flow downwardly therefrom through the tube 22 and be allowed to flare outwardly within the cup 25, the diameter of the cup 25 being sufficiently greater than that of the tube 22 so as to permit a space therearound sufficient to allow rats and mice to feed therein.

In operation the receptacle 18 is inverted from that shown in Fig. 1 so that the mouth portion 17 is upright, and the bait is placed within the receptacle 18. Then the gasket 20 is placed over and around the mouth piece 17; the shell 10 in its reverse position is dropped down over the mouth piece 17, and then the tube 22 is drawn up snugly against the under side of the top 19. While still in the reverse positions, the plate 23 with its cup 25 fixed thereto is then secured diametrically across and inside of the side wall 11 as above indicated, and then the entire assembly is turned over to be in the position as indicated in Fig. 1 where the receptacle 18 extends upwardly above the shell 10.

The dispenser thus assembled is placed in the locality where rats and mice have been observed to be, and the receptacle 18 is watched as to its contents dropping down, the receptacle 18 preferably being glass as above indicated, so that the contents may be watched accordingly. When the content does drop down, it is an indication that the bait is being taken by the rodents.

The preferable bait to be employed is not specifically what is known as a poison, but is the material in which is incorporated the chemical 3 - (alpha-acetonylbenzyl)-4-hydroxycoumarin. This is the chemical which is described in the U. S. Letters Patent No. 2,427,878.

In the use of this chemical, a single dose of the bait is not sufficient because the material serves to act as a blood hemorrhaging agent so that the rodents eventually die of hemorrhages. This will require all the way from five days to as much as two weeks before the final death of the rodents takes place. By reason of this fact, wherein the rodents do not die immediately after eating the bait, the bait is more readily taken particularly by rats who are entirely unsuspicious of the end result.

In coming into the shell 10, through any one of the various entrances 13, 14, 15, 16, the rodents, particularly the rats, may immediately get behind a section of the side wall 11, such for example as section A or B, or even sections C or D. The rat can back up against that portion of the wall in each instance, and feed out of the cup 25, without worrying about what may attack him from the rear. The only access to him would be through the adjacent openings which would be from his side, or even from the opposite side of the shell 10.

By reason of the use of the flat plate 23, it will be noticed that the rats particularly as well as mice will rest upon that plate to eat out of the cup 25. It seems that such rodents prefer to be up off of the ground when within the shell 10, and this affords an excellent place for them to rest upon with their backs against the sections A or B as the case may be. Thus the plate 23 affords a resting shelf spaced above the ground or the floor on which the shell 10 may be placed, such shelf affording the rodent a place to rest upon while eating.

Thus it is to be seen that I have produced a very simple but most effective dispenser of the rodent bait, and while I have described it in more or less minute detail, it is obvious that structural variations may be employed without departing from the spirit of the invention, and I therefore do not desire to be limited to that precise form beyond the limitations which may be imposed by the following claims.

I claim:

1. A rodent bait dispenser comprising a dome-shaped shell having an enclosing, downturned side wall with a lower boundary edge portion to rest upon the ground or floor, said side wall having a plurality of circumferentially spaced rodent entryways open therethrough at all times and of a size and shape for travel of a rat therethrough with a close clearance in each instance; a bait receptacle above and resting on said shell and detachably engaged therewith; said receptacle opening through said shell; an opaque walled tube within and carried by said shell extending downwardly from said receptacle; a plate extending diametrically across and within said shell, intermediate the top and bottom of said entryways, said plate being engaged with said shell wall substantially midway between adjacent entryways; and a bait receiving cup mounted on said plate and spaced below and centrally of the lower end of said tube; said tube and said cup forming a sight baffle between opposite entryways in respect to the upper areas only of the openings of said entryways above said plate; said shell side wall being of that diameter wherein the distance between said tube and a sector of the side wall between adjacent entryways is approximately equal to the length of the body of a rat, the space between said cup and said wall sector above the plate being free of barriers; the said wall of the shell between said entryways providing outwardly curved barriers into which a rat may fit its rear end for complete coverage thereof; said barriers having lengths in each instance greatly exceeding the circumferential widths of each of said entryways.

2. The structure of claim 1, in which said plate has a top surface of sufficient width in the nature of a shelf serving as a rodent supporting place while eating bait, and from which surface a rat may watch the lowermost portions of the entryways on each side of the plate.

THOMAS W. MULLEN.

References Cited in the file of this patent

UNITED STATES PATENTS

| Number | Name | Date |
|---|---|---|
| 1,113,887 | Dragan et al. | Oct. 13, 1914 |
| 1,184,486 | Myers | May 23, 1916 |
| 1,964,611 | Watson | June 26, 1934 |
| 1,994,859 | Langum | Mar. 19, 1935 |
| 2,456,324 | Roessner | Dec. 14, 1948 |
| 2,568,168 | Query | Sept. 18, 1951 |